(12) United States Patent
Ye

(10) Patent No.: US 11,074,245 B2
(45) Date of Patent: Jul. 27, 2021

(54) METHOD AND DEVICE FOR WRITING SERVICE DATA IN BLOCK CHAIN SYSTEM

(71) Applicant: ADVANCED NEW TECHNOLOGIES CO., LTD., Grand Cayman (KY)

(72) Inventor: Guojun Ye, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 34 days.

(21) Appl. No.: 16/584,579

(22) Filed: Sep. 26, 2019

(65) Prior Publication Data

US 2020/0019545 A1  Jan. 16, 2020

Related U.S. Application Data

(63) Continuation of application No. PCT/CN2018/087968, filed on May 23, 2018.

(30) Foreign Application Priority Data

May 25, 2017  (CN) .......................... 201710379983.8

(51) Int. Cl.
*G06F 16/00* (2019.01)
*G06F 16/23* (2019.01)
(Continued)

(52) U.S. Cl.
CPC ........ *G06F 16/2379* (2019.01); *G06F 16/215* (2019.01); *G06F 16/2255* (2019.01); *G06F 16/2358* (2019.01); *G06F 16/27* (2019.01)

(58) Field of Classification Search
None
See application file for complete search history.

(56) References Cited

U.S. PATENT DOCUMENTS 9,553,982 B2  1/2017  Unitt
9,595,034 B2  3/2017  Van Rooyen et al.
(Continued)

FOREIGN PATENT DOCUMENTS

CN  104079630 A  10/2014
CN  105488675 A  4/2016
(Continued)

OTHER PUBLICATIONS

Notice of Allowance for U.S. Appl. No. 16/775,116 dated May 13, 2020.
(Continued)

*Primary Examiner* — Bai D Vu

(57) ABSTRACT

A method for writing transaction data in a blockchain system is disclosed. The blockchain system comprises at least one blockchain. The method comprises: receiving a blockchain transaction data writing request comprising transaction feature information of transaction data to be added to the blockchain; determining a blockchain matching the transaction data to be added to the blockchain according to a blockchain data record table and the transaction feature information of the transaction data to be added to the blockchain, wherein the blockchain data record table records transaction type identification information associated with the blockchain for reflecting transaction feature information of transaction data in the blockchain; and writing an execution result of the transaction data to be added to the blockchain into the blockchain matching the transaction data to be added to the blockchain.

14 Claims, 4 Drawing Sheets

(51) Int. Cl.
  *G06F 16/215* (2019.01)
  *G06F 16/22* (2019.01)
  *G06F 16/27* (2019.01)

(56) References Cited

U.S. PATENT DOCUMENTS

| | | | |
|---|---|---|---|
| 9,710,808 | B2 | 7/2017 | Slepinin |
| 9,876,775 | B2 | 1/2018 | Mossbarger |
| 2012/0231824 | A1 | 9/2012 | Budic et al. |
| 2015/0262137 | A1 | 3/2015 | Armstrong |
| 2015/0170112 | A1 | 6/2015 | Decastro |
| 2015/0262171 | A1 | 9/2015 | Langschaedel et al. |
| 2015/0294413 | A1 | 10/2015 | Jonas et al. |
| 2015/0310476 | A1 | 10/2015 | Gadwa |
| 2015/0332283 | A1 | 11/2015 | Witchey |
| 2015/0363783 | A1 | 12/2015 | Ronca et al. |
| 2016/0028552 | A1 | 1/2016 | Spanos et al. |
| 2016/0217436 | A1 | 7/2016 | Brama |
| 2016/0260095 | A1 | 9/2016 | Ford |
| 2016/0261690 | A1 | 9/2016 | Ford |
| 2016/0292672 | A1 | 10/2016 | Fay et al. |
| 2017/0046651 | A1 | 2/2017 | Lin et al. |
| 2017/0109735 | A1 | 4/2017 | Sheng et al. |
| 2017/0124534 | A1 | 5/2017 | Savolainen |
| 2017/0132625 | A1 | 5/2017 | Kennedy |
| 2017/0132630 | A1 | 5/2017 | Castinado et al. |
| 2017/0364552 | A1 | 12/2017 | Pattanaik et al. |
| 2018/0091524 | A1 | 3/2018 | Setty et al. |
| 2019/0013931 | A1 | 1/2019 | Benini |

FOREIGN PATENT DOCUMENTS

| | | |
|---|---|---|
| CN | 106407430 A | 2/2017 |
| CN | 106446705 A | 2/2017 |
| CN | 106534085 A | 3/2017 |
| CN | 106548091 A | 3/2017 |
| CN | 106682984 A | 5/2017 |
| CN | 107368259 A | 11/2017 |
| KR | 101701131 B1 | 2/2017 |
| TW | M542178 U | 5/2017 |
| WO | 2015142765 A1 | 9/2015 |
| WO | 2017044554 A1 | 3/2017 |
| WO | 2017079214 A1 | 5/2017 |

OTHER PUBLICATIONS

Non-final rejection and Search Report for Taiwanese Application No. 107108219 dated Mar. 13, 2019 (10 pages).
Written Opinion of the International Searching Authority and International Search Report for PCT Application No. PCT/CN2018/087968 dated Jul. 25, 2018 with partial English translation (9 pages).
First Search for Chinese Application No. 201710379983.8 dated May 31, 2019 (1 page).
First Office Action for Chinese Application No. 201710379983.8 dated Jun. 12, 2019 5 pages).
Written Opinion for Singaporean Application No. 11201909249Q dated Jun. 16, 2020.
Office Action for Japanese Application No. 2019-565191 dated Oct. 13, 2020.
Akihiro Toriyabe, et al., Comprehensive Introduction to Smart Contracts, Gijutsu-Hyohron Co., Ltd., Mar. 1, 2017, first edition, pp. 54 to 59.
Notice of Allowance for Korean Application No. 10-2019-7032391 dated Dec. 4, 2020.
International Preliminary Report on Patentability Chapter I for PCT Application No. CT/CN2018/087968 dated Dec. 5, 2019 (12 pages).
Second Office Action for Chinese Application No. 201710379983.8 dated Feb. 28, 2020.
Search Report for European Application No. 18805039.7 dated Feb. 10, 2020 (5 pages).
Examination Report for European Application No. 18805039.7 dated Feb. 21, 2020 (6 pages).
Bitfury: "Public versus Private Blockchains Part 2: Permissionless Blockchains White Paper," Oct. 20, 2015 (20 pages).
Sergio Demian Lerner, "Drivechains, Sidechains and Hybrid 2-way peg Designs—Revision 9," Jan. 4, 2016 (31 pages).
Preinterview first office action for U.S. Appl. No. 16/775,116 dated Mar. 16, 2020.

METHOD AND DEVICE FOR WRITING SERVICE DATA IN BLOCK CHAIN SYSTEM

CROSS REFERENCE TO RELATED APPLICATIONS

The present application is a continuation application of the International Patent Application No. PCT/CN2018/087968, filed on May 23, 2018, and titled "Method and Device for Writing Service Data in Block Chain System," which claims priority to Chinese Patent Application No. 201710379983.8 filed on May 25, 2017. The entire contents of all of the above applications are incorporated herein by reference in their entirety.

TECHNICAL FIELD

The present application relates to the field of computer technologies, and in particular, to a method and device for writing transaction data in a blockchain system.

BACKGROUND

With the development of computer technologies, blockchain technologies (also referred to as distributed ledger network) have been extensively used, due to advantages such as decentralization, openness and transparency, immutability, and trustworthiness, in various fields, such as smart contracts, securities transactions, e-commerce, Internet of Things, social communications, document storage, existence proof, identity verification, and equity crowd-funding.

When a transaction system is implemented based on blockchain technologies, the transaction system (which may also be referred to as a blockchain system as the system is implemented using blockchain technology) needs to write transaction data in a blockchain. When the blockchain system receives transaction data to be added to a blockchain (which may also be referred to as a transaction in blockchain technologies), the blockchain system chronologically executes these transactions using a first-in first-out sequence, thereby completing operations such as transaction verification, implementation, writing data into blockchain, etc.

In current technologies, to fully and reasonably use computation resources of a blockchain system, the blockchain system may comprise many different types of transactions and equally treat these different types of transaction data chronologically. In some cases, however, the manner in which transactions are executed chronologically is unable to meet application demand. For example, when various types of information having different confidentiality levels are processed, the blockchain system may receive transactions for processing information of different confidentiality levels. At this point, the information of different confidentiality levels may need to be isolated to prevent leaking information of a higher confidentiality level from and to ensure the information security. Therefore, when a special control needs to be performed on a transaction, the manner of writing blockchain transaction data in current technologies is unable to meet the application demand.

Therefore, there is an urgent need for a method for writing transaction data that can meet transaction processing needs for different types of transaction data in a blockchain system having various types of transaction data.

SUMMARY

Embodiments of the present disclosure provide a method and device for writing transaction data in a blockchain system, meeting the needs for processing different types of transaction data in a blockchain system.

The embodiments of this disclosure provide a method for writing transaction data in a blockchain system, the blockchain system maintaining at least one blockchain, and the method comprising: receiving a blockchain transaction data writing request comprising transaction feature information of transaction data to be added to the blockchain; determining a blockchain matching the transaction data to be added to the blockchain according to a blockchain data record table and the transaction feature information of the transaction data to be added to the blockchain, wherein the blockchain data record table records transaction type identification information associated with the blockchain for reflecting transaction feature information of transaction data in the blockchain; and writing an execution result of the transaction data to be added to the blockchain into the blockchain matching the transaction data to be added to the blockchain.

In some embodiments, the determining a blockchain matching the transaction data to be added to the blockchain according to a blockchain data record table and the transaction feature information of the transaction data to be added to the blockchain comprises: when first transaction type identification information satisfying a first preset condition is in the blockchain data record table, determining a blockchain corresponding to the first transaction type identification information as the blockchain matching the transaction data to be added to the blockchain; wherein the first preset condition comprises: the first transaction type identification information matching the transaction feature information of the transaction data to be added to the blockchain.

In some embodiments, the transaction feature information is $N^{th}$ power of 2, wherein N is 0 or a positive integer; and the transaction type identification information of the blockchain is a sum of different pieces of transaction feature information of transaction data in the blockchain.

In some embodiments, the first transaction type identification information matching the transaction feature information of the transaction data to be added to the blockchain comprises: if an "&" logic operation on a value of the first transaction type identification information and a value of the transaction feature information of the transaction data to be added to the blockchain is equal to the value of the transaction feature information of the transaction data to be added to the blockchain, the first transaction type identification information matches the transaction feature information of the transaction data to be added to the blockchain.

In some embodiments, the determining a blockchain matching the transaction data to be added to the blockchain according to a blockchain data record table and the transaction feature information of the transaction data to be added to the blockchain further comprises: when no first transaction type identification information satisfying the first preset condition is in the blockchain data record table, determining a blockchain corresponding to preset second transaction type identification information as the blockchain matching the transaction data to be added to the blockchain.

In some embodiments, the blockchain data record table further records state information associated with the blockchain, and the first transaction type identification information satisfying the first preset condition further comprises: the state information associated with the blockchain corresponding to the first transaction type identification information being a valid state.

In some embodiments, the blockchain data record table further records a hash value of a last block of the blockchain and a corresponding time stamp, and the writing an execution result of the transaction data to be added to the blockchain into the blockchain matching the transaction data to be added to the blockchain comprises: extracting the last block hash value corresponding to the blockchain matching the transaction data to be added to the blockchain and the corresponding time stamp; writing an execution result of the transaction data to be added to the blockchain, the last block hash value, and the corresponding time stamp into a new block of the blockchain; and updating the blockchain data record table with a hash value of the new block and a corresponding time stamp as a new last block hash's value and corresponding time stamp.

In some embodiments, the blockchain system comprises a main chain, and after the receiving a blockchain transaction data writing request, the method further comprises: when a second preset condition is satisfied, adding a new blockchain into the blockchain system as a sidechain, and adding, in the blockchain data record table, a record corresponding to the new blockchain and transaction type identification information of the new blockchain.

In some embodiments, the second preset condition comprises: the transaction feature information of the transaction data to be added to the blockchain comprised in the blockchain transaction data writing request matching preset transaction feature information; and/or a concurrent number of the received blockchain transaction data writing requests reaches a preset threshold value; and/or a preset time for adding the new blockchain as a sidechain is reached.

In some embodiments, the blockchain system comprises a main chain and a sidechain, and after the receiving a blockchain transaction data writing request, the method further comprises: when a third preset condition is satisfied, terminating the blockchain as the sidechain in the blockchain system, and updating a record corresponding to the terminated blockchain in the blockchain data record table.

In some embodiments, the third preset condition comprises: a concurrent number of the received blockchain transaction data writing requests being smaller than a preset threshold value; and/or a time of validity of the sidechain is reached.

In some embodiments, the updating a record corresponding to the terminated blockchain in the blockchain data record table comprises: deleting the record corresponding to the terminated blockchain; or when the state information of the terminated blockchain is recorded in the blockchain data record table, changing the state information of the terminated blockchain to an invalid state.

The embodiments of this disclosure further provide a device for writing transaction data in a blockchain system, the blockchain system comprises at least one blockchain, and the device comprises: a request receiving module configured to receive a blockchain transaction data writing request comprising transaction feature information of transaction data to be added to the blockchain; a blockchain determining module configured to determine a blockchain matching the transaction data to be added to the blockchain according to a blockchain data record table and the transaction feature information of the transaction data to be added to the blockchain, wherein the blockchain data record table records transaction type identification information associated with the blockchain for reflecting transaction feature information of transaction data in the blockchain; and a blockchain data-adding module configured to write an execution result of the transaction data to be added to the blockchain into the blockchain matching the transaction data to be added to the blockchain.

The embodiments of this disclosure further provide a system for writing transaction data. The system maintains at least one blockchain and comprises one or more processors and one or more non-transitory computer-readable memories coupled to the one or more processors and configured with instructions executable by the one or more processors to cause the system to perform operations comprising: receiving a blockchain transaction data writing request comprising transaction feature information of transaction data to be added to the blockchain; determining a blockchain matching the transaction data to be added to the blockchain according to a blockchain data record table and the transaction feature information of the transaction data to be added to the blockchain, wherein the blockchain data record table records transaction type identification information associated with the blockchain for reflecting transaction feature information of transaction data in the blockchain; and writing an execution result of the transaction data to be added to the blockchain into the blockchain matching the transaction data to be added to the blockchain.

The embodiments of this disclosure further provide a non-transitory computer-readable storage medium for writing transaction data in a blockchain system, the system maintaining at least one blockchain, the storage medium configured with instructions executable by one or more processors to cause the one or more processors to perform operations comprising: receiving a blockchain transaction data writing request comprising transaction feature information of transaction data to be added to the blockchain; determining a blockchain matching the transaction data to be added to the blockchain according to a blockchain data record table and the transaction feature information of the transaction data to be added to the blockchain, wherein the blockchain data record table records transaction type identification information associated with the blockchain for reflecting transaction feature information of transaction data in the blockchain; and writing an execution result of the transaction data to be added to the blockchain into the blockchain matching the transaction data to be added to the blockchain.

At least one of the above technical solutions adopted by the embodiments of this disclosure can achieve the following advantageous effects. In the embodiments of this disclosure, a blockchain system receives a blockchain transaction data writing request that comprises transaction feature information of transaction data to be added to the blockchain. Since transaction type identification information associated with the blockchain is recorded in a blockchain data record table and the identification information can reflect transaction feature information of transaction data in the blockchain, a blockchain matching the transaction data to be added to the blockchain can be determined according to the blockchain data record table and the transaction feature information of the transaction data to be added to the blockchain, and then an execution result of the transaction data to be added to the blockchain can be written into the matching blockchain. By adopting the technical solutions according to the embodiments of this disclosure, a matching blockchain can be selected according to the transaction feature information of transaction data to be added to the blockchain to complete the process of writing data into the blockchain, and a blockchain data record table is created that can record blockchains corresponding to transaction types. Therefore, it is possible to distinctively process different types of transaction data, and the processing demands for different types of transaction data in a blockchain system may be satisfied.

BRIEF DESCRIPTION OF THE DRAWINGS

The accompanying drawings to be described in the specification are used to provide a further understanding of this disclosure and constitute a part of this disclosure. The exemplary embodiments of this disclosure and description of the exemplary embodiments are used to explain this disclosure, and do not constitute improper limitations to this disclosure. In the accompanying drawings.

DETAILED DESCRIPTION

To make objectives, technical solutions, and advantages of this disclosure clearer, the technical solutions of this disclosure will be clearly and completely described below with reference to the embodiments and the accompanying drawings of this disclosure. The described embodiments are merely some, but not all, embodiments of this disclosure. Based on the embodiments of this disclosure, all other embodiments obtainable by one of ordinary skill in the art without creative effort shall fall within the scope of this disclosure.

The technical solutions provided in the embodiments of this disclosure will be described in detail below with reference to the accompanying drawings.

The embodiments of this disclosure provide a method for writing transaction data in a blockchain system, and the blockchain system comprises at least one blockchain. If the blockchain system comprises only one blockchain, the blockchain may be regarded as the main chain of the blockchain system, and all execution results of various types of transaction data written in the blockchain system are written in the main chain by default. In an exemplary implementation, transaction data to be added to the blockchain is executed, according to transaction processing requirements of the blockchain system, in a temporal order that blockchain transaction data writing requests are received, and is written into the main chain in the temporal order.

Figure 4:
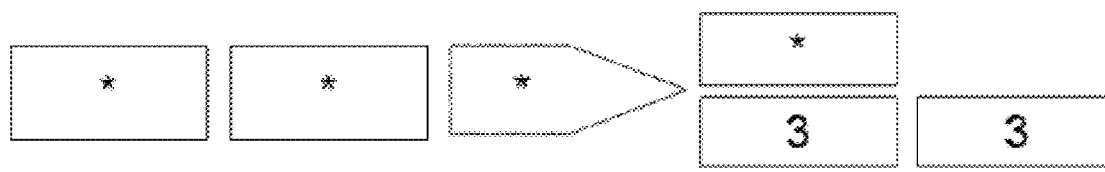
FIG. 4 is another schematic diagram of a main chain and a side chain in the blockchain system of this disclosure.
Figure 5:
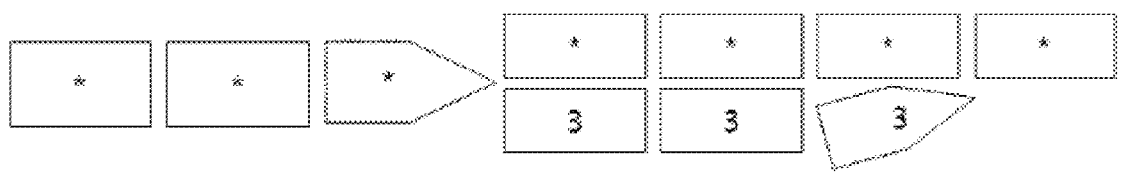
FIG. 5 is a schematic diagram of a side blockchain being terminated in the blockchain system of this disclosure.

If the blockchain system comprises a plurality of blockchains, one of the blockchains is referred to as the main chain of the blockchain system, while the other blockchains are referred to as sidechains of the blockchain system. In some embodiments, a sidechain may comprise a series of blocks in a blockchain that is associated with another blockchain, neither blockchain having an effect on the integrity of the other. In some embodiments, for example, as shown in FIG. 4, a sidechain (labelled with 3) may be separated from and attached to the main chain (labelled with *) using a two-way peg. In some embodiments, for example, as shown in FIG. 5, a sidechain (labelled with 3) may branch off from a block of the main chain (labelled with *) and then rejoin the main chain at a later block of the main chain. In some embodiments of this disclosure, there may be one main chain in the blockchain system. When there is no special configuration, all execution results of various types of transaction data written in the blockchain system may be written in the main chain by default. If necessary, one or more sidechains may be separated in the blockchain system. Each of the sidechains correspondingly processes transaction data of one or more different transaction types. Then, according to transaction feature information of transaction data, one or more types of transaction data having special processing requirements may be allocated to the sidechains for processing without affecting the processing of transaction data of other transaction types written in the main chain and in other sidechains (if any). Therefore, transaction processing demands for different types of transaction data may be satisfied. An implementation process of the embodiments of this disclosure will be described in detail through examples.

Figure 1:
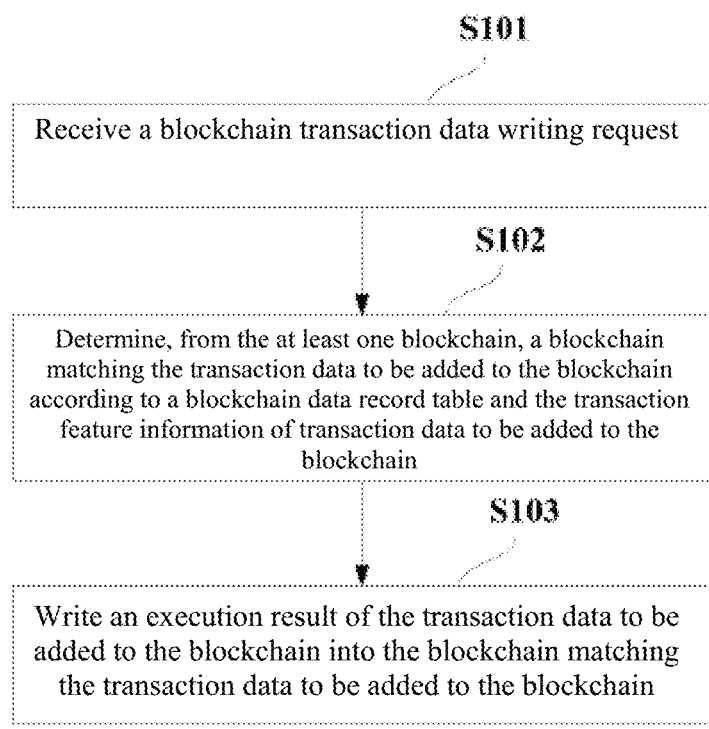
FIG. 1 is a flow chart of a method for writing transaction data in a blockchain system according to some embodiments of this disclosure.

Referring to FIG. 1, the method for writing transaction data in a blockchain system according to the embodiments of this disclosure may, for example, comprise:

S101: receiving a blockchain transaction data writing request comprising transaction feature information of transaction data to be added to the blockchain;

S102: determining, from the at least one blockchain, a blockchain matching the transaction data to be added to the blockchain according to a blockchain data record table and the transaction feature information in the blockchain transaction data writing request, wherein the blockchain data record table records transaction type identification information associated with the blockchain for reflecting transaction feature information of transaction data in the blockchain; and S103: writing an execution result of the transaction data to be added to the blockchain into the blockchain matching the transaction data to be added to the blockchain.

The blockchain transaction data writing request (which may also be referred to as transaction in the blockchain technology system, the English name being transaction and the abbreviation being tx) received as a result of the blockchain system executing the step S101 is used for requesting execution of transaction data to be added to the blockchain, so as to write an execution result of the transaction data to be added to the blockchain into a blockchain in the blockchain system. The request comprises information regarding the transaction data to be added to the blockchain, such as transaction feature information of the transaction data to be added to the blockchain and the like. The transaction feature information of the transaction data to be added to the blockchain is used for reflecting which type of transaction data the transaction data to be added to the blockchain belongs to, so as to distinguish different types of transaction data. In the embodiments of this disclosure, the types of transaction data may be classified according to different dimensions. For example, the types of transaction data may be classified, according to transaction data processing manners, into contract transactions, transfer transactions, and the like; or may be classified, according to information confidentiality levels of transaction data, into strictly confidential, confidential, secret, etc.

In the embodiments of this disclosure, a character form, such as A, B, C, and D, may be used to represent the transaction feature information of the transaction data, as long as different types of transaction data can be distinguished. Assuming that the blockchain system comprises three sidechains that are respectively used to process transactions of type A and type D (which may be represented by

[A, D]), transactions of type B and type C (which may be represented by [B, C]), and transactions of type D (which may be represented by [D]), the blockchain data record table can be traversed when a blockchain matching the transaction data to be added to the blockchain is determined, to perform character string matching between the transaction feature information of the transaction data to be added to the blockchain (which may be represented in the character form, save the transaction data to be added to the blockchain (which may also be referred to as a transaction) corresponding to the request into a local cache (which may refer to a transaction pool of the blockchain system) for subsequent processing. A table structure of a transaction model table shown in Table 1 may be used for recording information related to the transaction data to be added to the blockchain in the cache.

TABLE 1

Example of a transaction model table structure

| Model attributes | Explanation of the attributes |
|---|---|
| Transaction identifier | Unique identifier of each transaction, which may be expressed by a hash value of the transaction |
| Version | Version identification of the transaction generation mechanism |
| Public key | Public key of a transaction initiator |
| Signature | Information signed by the transaction initiator using a private key. If the public key verification succeeds, it indicates that the transaction is valid |
| Examples of the value of transaction feature information | Information regarding a transaction type of the transaction, such as fund flow, changes to asset ownership, etc., and the information is provided by the transaction initiator |
| Hash of the block to which the transaction belongs | If the transaction is incorporated in the consensus, the hash value of the block to which the transaction belongs is used here. If the transaction has not been incorporated in the consensus, it is blank here and will be filled in after the transaction is incorporated in the consensus, i.e., the hash value of the block after the transaction is added to the blockchain will be used here. |
| . . . | Other attributes are omitted and will not be elaborated. |
| Time stamp | Time stamp of the time when a blockchain transaction data writing request is received, and may have, for example, a millisecond-level accuracy | such as A, B, C, and D, in the embodiments) and transaction type identification information associated with the blockchain recorded in the blockchain data record table (which may be represented in the form such as [A, D], [B, C], and [D]), thereby determining a blockchain into which the transaction data to be added to the blockchain should be written and executing a subsequent operation of writing the data into the blockchain.

In one embodiment, the transaction feature information is expressed in the form of $N^{th}$ power of 2, wherein the parameter N is 0 or a positive integer. The expression of the transaction feature information of transaction data in this form has the following advantage: when transaction data of different transaction types are simultaneously written into a sidechain, the expression of the transaction feature information in the form of $N^{th}$ power of 2, i.e., the form of $2^N$ (N≥0), can further facilitate the computation of transaction type identification information and subsequent logic operations corresponding to the sidechain. The process of computation of transaction type identification information and the process of logic operations will be further described through examples below.

In addition to the transaction feature information of the transaction data to be added to the blockchain, the blockchain transaction data writing request may further comprise information signed by a transaction initiator using a private key, and the information is used for verification with a public key when the blockchain system processes the transaction data corresponding to the request; if the verification succeeds, it indicates that the transaction is valid and is allowed to be written into the current blockchain system for the subsequent step of writing the data into the blockchain; otherwise, the execution of the transaction is rejected.

After the blockchain system receives the blockchain transaction data writing request, the blockchain system may After the blockchain system receives the blockchain transaction data writing request, the blockchain system executes the step S102 to determine, from the at least one blockchain, a blockchain matching the transaction data to be added to the blockchain according to the blockchain data record table and the transaction feature information of the transaction data to be added to the blockchain. For a sidechain in the blockchain system, the transaction type identification information of the sidechain recorded in the blockchain data record table may be determined and obtained according to transaction feature information of one or more types of transaction data written into the sidechain. Therefore, the transaction type identification information of the sidechain can reflect transaction feature information of the transaction data in the sidechain. The transaction type identification information of the main chain in the blockchain system may be indicated by a preset identifier, such as "*," etc., as long as the identifier can be readily distinguished from the transaction type identification information of the sidechain and results will not be confused in subsequent logic operations with a value of the transaction feature information of the transaction data to be added to the blockchain.

Take the above transaction feature information shown in a form of $N^{th}$ power of 2, i.e., the form of $2^N$ (N≥0), as an example. If one sidechain A comprises two types of transaction data, the transaction type identification information of the sidechain A may be determined according to the transaction feature information of these two types of transaction data. For example, assuming that the value of the transaction feature information of the first type of transaction data is $2^0$ (at this point, the value of N is 0), which corresponds to a seller transaction, and the value of the transaction feature information of the second type of transaction data is $2^1$ (at this point, the value of N is 1), which corresponds to a mobile phone authentication transaction. Then, the transaction type identification information of the sidechain A in this example may be the sum of the values of the transaction feature information of the two types of transaction data written into the sidechain A, i.e., $2^0+2^1$, which may be expressed by a decimal number and reported as 3.

Since the blockchain data record table shows a correspondence between a blockchain and transaction types of transaction data written into the blockchain (the transaction types being reflected by transaction type identification information that is capable of reflecting transaction feature information of transaction data written in the blockchain), a blockchain matching the transaction data to be added to the blockchain may be found and determined in the blockchain data record table by executing the step S102 according to the transaction feature information of the transaction data to be added to the blockchain (the transaction feature information being capable of representing a transaction type of the transaction data to be added to the blockchain), and then the step S103 may be executed to complete the writing of the transaction data to be added to the blockchain into the blockchain.

For example, the following method may be adopted when the step S102 is executed: when first transaction type identification information satisfying a first preset condition is found in the blockchain data record table, determining a blockchain corresponding to the first transaction type identification information as the blockchain matching the transaction data to be added to the blockchain; wherein the first transaction type identification information satisfying a first preset condition comprises: the first transaction type identification information matching the transaction feature information of the transaction data to be added to the blockchain.

Since correspondences have been established between blockchains and transaction type identification information in the blockchain data record table, what types of transaction data have been included in the blockchains can be reflected, and a matching blockchain may be determined for the transaction data to be added to the blockchain if the transaction feature information of the transaction data to be added to the blockchain matches the first transaction type identification information recorded in the blockchain data record table, i.e., determining which blockchain the transaction data having the type of the transaction data to be added to the blockchain should be written into.

Furthermore, the following manner may be used when it is determined whether the above first preset condition is satisfied, i.e., whether the first transaction type identification information matches the transaction feature information of the transaction data to be added to the blockchain: if an "&" logic operation on the value of the first transaction type identification information and the value of the transaction feature information of the transaction data to be added to the blockchain is equal to the value of the transaction feature information of the transaction data to be added to the blockchain, the first transaction type identification information matches the transaction feature information of the transaction data to be added to the blockchain. In an example operation, an "&" logic operation may be performed on the value of the transaction feature information of the transaction data to be added to the blockchain and each of the transaction type identifiers recorded in the blockchain data record table, until finding the first transaction type identification information that makes the value of an "&" logic operation equal to the value of the above transaction feature information. Alternatively, whether the result of a logic expression of "a value of transaction feature information & a value of first transaction type identification information==the value of the transaction feature information" is true may be calculated, and the first transaction type identification information that makes the value of the logic expression to be "true" may be determined as matching the transaction feature information of the transaction data to be added to the blockchain.

Continually using the above example, assuming that the received transaction data to be added to the blockchain is a mobile phone authentication type, and the value of the transaction feature information corresponding to the transaction data to be added to the blockchain is $2^1$ (at this point, the value of N is 1). By performing an "&" logic operation on the value of the transaction feature information of $2^1$ and the value of transaction type identification information recorded in the blockchain data record table, the computational result of a binary "&" operation on the value of the transaction feature information of $2^1$ and the value of transaction type identification information of the sidechain A of 3 ($2^0+2^1$) is 2, which is equal to the value of the transaction feature information of $2^1$. Then, the transaction type identification information of the sidechain A may be treated as the first transaction type identification information that matches the transaction feature information of the transaction data to be added to the blockchain, and the sidechain A may be determined as the blockchain that matches the transaction data to be added to the blockchain, indicating that the transaction data to be added to the blockchain should be written into the sidechain A.

During the binary "&" operation, the transaction type identification information in a decimal format is first converted to a binary character string, and then the operation is performed according to the computation principle of the binary "&" operation: 0 & 0=0, 0 & 1=0, 1 & 0=0, 1 & 1=1, thereby obtaining the computational result. For example, the operation process in the above example may be expressed as:

$$2\&3 \rightarrow 10\&11=10 \rightarrow 2=2^1$$

When the above process of searching for the matching first transaction type identification information is implemented on a computer, there may be a variety of manners. For example, an SQL determination statement may be used to implement the selection of first transaction type identification information, from the blockchain data record table, that makes the value of "a value of transaction feature information & a value of transaction type identification information==the value of the transaction feature information" to be "true." Alternatively, data may be extracted from the blockchain data record table into a memory, and the search is completed by cyclic comparison using a program. Accordingly, the process of cyclic comparison may be further optimized. For example, transaction type identification information in the blockchain data record table is divided to place records that satisfy the condition of "the value of transaction type identification information %2==0," i.e., the records having a value of transaction type identification information that is a multiple of 2, into a hash table, and to place records having a value of transaction type identification information that is not a multiple of 2 into a circular queue for traversing, thereby reducing the number of cycles and improving the search efficiency.

When the above examples of steps are used to execute the step S102, a situation that no first transaction type identification information satisfying the above first preset condition is found in the blockchain data record table may occur. This situation may refer to that the blockchain system does not comprise a sidechain incorporating the type of transaction data as the transaction data to be added to the blockchain. Then, the blockchain corresponding to preset second transaction type identification information may be directly determined as the blockchain matching the transaction data to be added to the blockchain. In a sample implementation, the preset second transaction type identification information may be an identifier corresponding to the main chain, such as "*," thereby determining the blockchain matching the transaction data to be added to the blockchain as the main chain in the blockchain system and writing an execution result of the transaction data that is to be added to the blockchain and that has not been allocated to a sidechain for processing into the above main chain.

In the embodiments of this disclosure, in addition to the transaction type identification information corresponding to blockchains, state information associated with the blockchains may also be recorded in the blockchain data record table. The state information of a blockchain may be used for reflecting whether the blockchain is valid, i.e., whether the corresponding blockchain can accept new blocks. For the main chain in the blockchain system, the state information of the main chain may be in a valid state; otherwise, it may cause the blockchain system to fail to operate normally. For a sidechain in the blockchain system, when a transaction type corresponding to the sidechain (i.e., the transaction type represented by the transaction type identifier of the sidechain) is allowed to be incorporated into the sidechain, the state information of the sidechain is in a valid state; when the transaction type corresponding to the sidechain is not allowed to be incorporated into the sidechain, the state information of the sidechain is in an invalid state.

In the process of determining a blockchain matching the transaction data to be added to the blockchain according to the blockchain data record table, the issue of matching between the transaction type identification information of a blockchain and the transaction feature information of the transaction data to be added to the blockchain is considered, and moreover, the validity of the blockchain itself may also be considered. If the state information associated with the blockchain recorded in the blockchain data record table is an invalid state, the transaction data to be added to the blockchain may not be written into this invalid blockchain. Therefore, when the first transaction type identification information is determined, it may also be required that the state information associated with the blockchain corresponding to the first transaction type identification information is a valid state.

In an example implementation, it may be required that the two conditions are satisfied simultaneously, i.e., the first transaction type identification information satisfying the first preset condition comprises: the first transaction type identification information matching the transaction feature information of the transaction data to be added to the blockchain, and the state information associated with the blockchain corresponding to the first transaction type identification information is a valid state. In an example of an implementation of the determining process, the order of determining the two conditions may be exchangeable, which is not limited in the embodiments of this disclosure. In other words, state information associated with the blockchain recorded in the blockchain data record table may be determined first, and then blockchains with valid state information are searched for any blockchain matching the transaction data to be added to the blockchain; alternatively, the blockchain data record table may be searched for the first transaction type identification information that matches the transaction feature information of the transaction data to be added to the blockchain, and then whether the state information associated with the blockchain corresponding to the first transaction type identification information is a valid state is determined; if the state information associated with the blockchain corresponding to the first transaction type identification information is a valid state, the corresponding blockchain is determined to be the blockchain matching the transaction data to be added to the blockchain.

In the embodiments of this disclosure, the last block hash value of a blockchain and a corresponding time stamp may also be recorded in the blockchain data record table. For example, the table structure shown in Table 2 below is used for recording.

TABLE 2

Example of a table structure of the blockchain data record table

| Model attributes | Explanation of the attributes |
|---|---|
| Transaction type identification information | Indicating detailed transaction information incorporated in the blockchain, such as fund flow, changes to asset ownership, etc. |
| Hash value of the last block | The hash value (Hash value) of the last block in the blockchain |
| Time stamp | Time stamp corresponding to the last block in the blockchain |
| State information | Indicating whether the blockchain is in a valid state or an invalid state, e.g., using "1" to indicate a valid state, and using "0" to indicate an invalid state |

Figure 2:
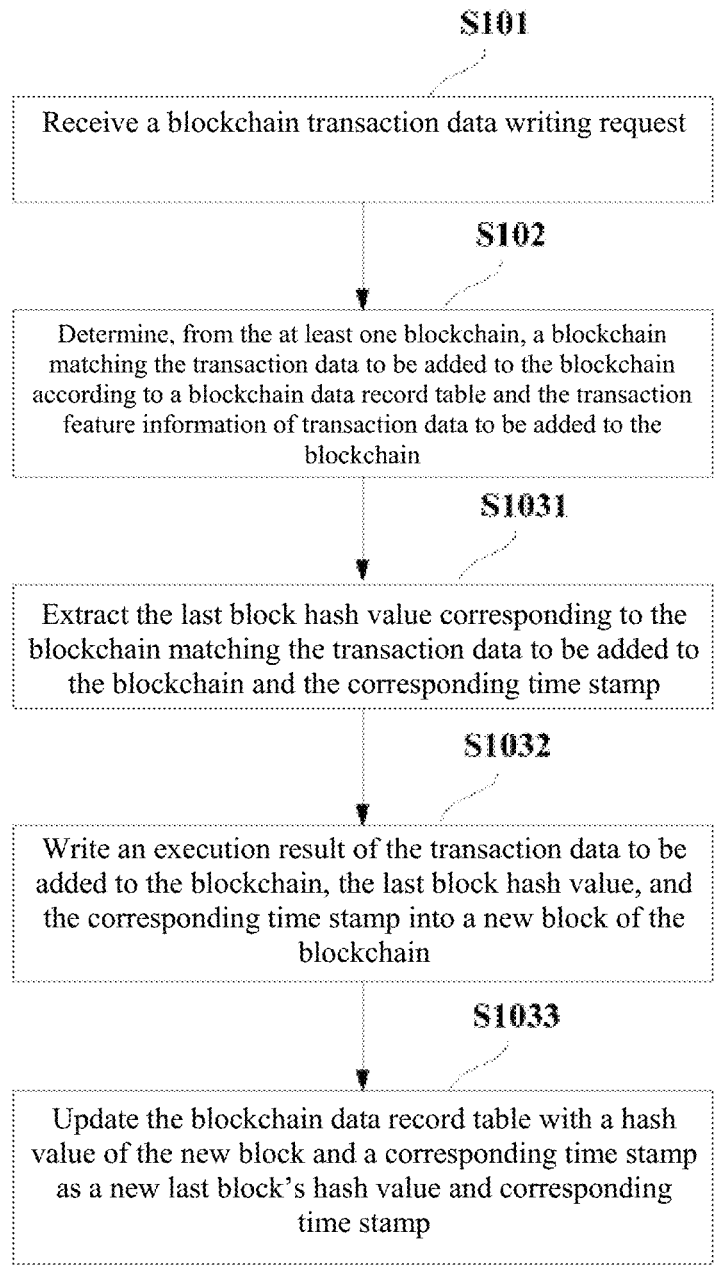
FIG. 2 is a flow chart of another method for writing transaction data in a blockchain system according to some embodiments of this disclosure.

For the blockchain data record table provided in the form shown in Table 2, the following steps may be followed when the blockchain system executes the step S103 to write an execution result of the transaction data to be added to the blockchain into the blockchain matching the transaction data to be added to the blockchain, see FIG. 2:

S1031: extracting the last block hash value corresponding to the blockchain matching the transaction data to be added to the blockchain and the corresponding time stamp;

S1032: writing an execution result of the transaction data to be added to the blockchain, the last block hash value, and the corresponding time stamp into a new block of the blockchain; and S1033: updating the blockchain data record table with a hash value of the new block and a corresponding time stamp as a new last block's hash value and corresponding time stamp.

In the above-described implementation process, if transaction data of the same type is simultaneously incorporated into multiple sidechains, it is possible to find multiple pieces of transaction type identification information satisfying the first preset condition in the blockchain data record table. Then, the transaction data to be added to the blockchain may need to be incorporated into multiple matching blockchains, and the last block hash values corresponding to these blockchains and corresponding time stamps in the blockchain data record table may need to be updated.

This situation will be described below with an example. Assuming that many types of transaction data are incorporated into the blockchain system. In addition to the seller transaction having the value $2^0$ of the transaction feature information and mobile phone authentication transaction having the value $2^1$ of the transaction feature information mentioned in the above example, there is also a mobile phone registration transaction having the value $2^2$ of the transaction feature information (at this point, the value of N is 2), and the like. Correspondence relationships between values of transaction feature information of all transaction types incorporated in a blockchain system and practical transactions corresponding to all the transaction types may be preset by a developer of the blockchain system, as shown in Table 3. When it is necessary to incorporate a new type into the blockchain system, a new correspondence relationship may be added to meet the demand for system expansion. When transaction feature information is being set, values of the transaction feature information are assigned to various transaction types in a manner of incrementing the natural number N, as shown in Table 3.

TABLE 3

Example of a transaction feature information correspondence table

| Description of transaction types | Transaction feature information |
|---|---|
| Seller transaction | 1 ($2^0$) |
| Mobile phone authentication transaction | 2 ($2^1$) |
| Mobile phone registration transaction | 4 ($2^2$) |
| Refund transaction | 8 ($2^3$) |
| . . . | $2^N$ (N > 3) |

Assuming that the blockchain system incorporates the seller transaction and the mobile phone authentication transaction into sidechain I and incorporates the seller transaction and the mobile phone registration transaction into sidechain II, then the blockchain data record table is as shown in Table 4:

TABLE 4

Example of the blockchain data record table

| Transaction type identification information | Hash value of the last block | State information | Time stamp |
|---|---|---|---|
| * | Code*-1 | 1 | 2017 Feb. 13 |
| 3 | Code3-1 | 1 | 2017 Feb. 15 |
| 5 | Code5-1 | 1 | 2017 Feb. 14 |
| . . . | | | |

When the transaction data to be added to the blockchain is the seller transaction and has a value 1 of the transaction feature information, two blockchains with the transaction type identification information of 3 and 5 respectively both satisfy the requirements by the first preset condition according to the manner in the above embodiment. Therefore, the seller transaction will be added to the blockchain simultaneously or successively into the two sidechains with the transaction type identification information of 3 and 5, and the hash values of the last blocks of these two blockchains will be correspondingly updated. For example, the hash value of Code3-1 is updated to a hash value of Code3-2, and the hash value of Code5-1 is updated to a hash value of Code5-2. The time stamps corresponding to the block hash values are accordingly updated with the generation of new blocks.

In this example, when the transaction data to be added to the blockchain is the refund transaction and has a value 8 ($2^3$) of the transaction feature information, no transaction type identification information satisfying the first preset condition can be found in the blockchain data record table according to the manner in the above embodiment, indicating the blockchain system has not established a sidechain to process this type of transaction. Therefore, the execution result of the transaction data to be added to the blockchain is written into the main chain (the transaction type identification information is "*"), and the hash values of the last block of the main chain and corresponding time stamp are correspondingly updated. For example, Code*-1 is updated to Code*-2.

How to determine a blockchain matching the transaction data to be added to the blockchain according to the blockchain data record table is described in detail above, for implementing various embodiments of writing data into blockchain. The description below will focus on different processing manners for blockchains in the blockchain system in different situations and impacts on the blockchain data record table.

Figure 3:
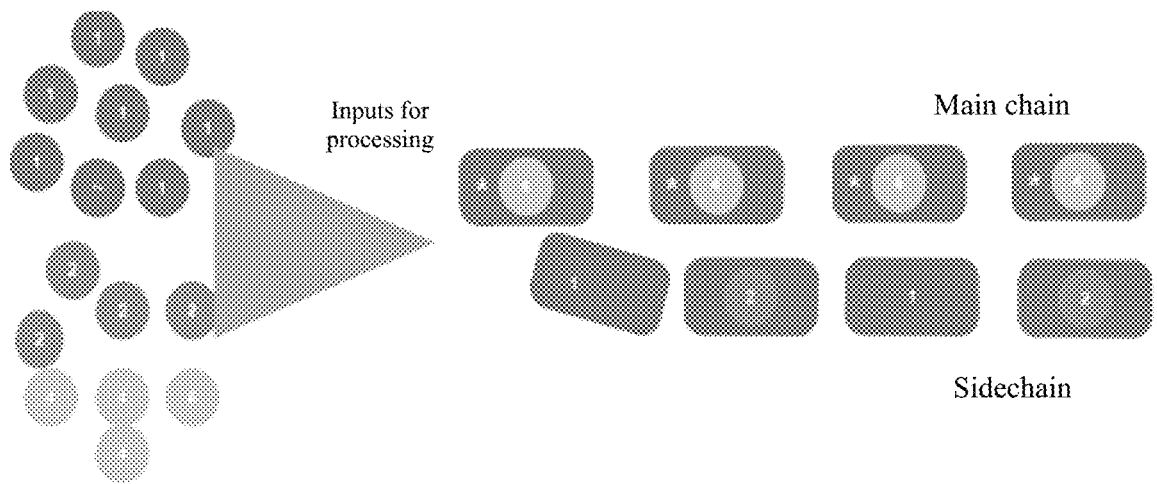
FIG. 3 is a schematic diagram of a main chain and a side chain in the blockchain system of this disclosure.

After the blockchain system receives the blockchain transaction data writing request, the method according to the embodiments of this disclosure may further comprise: when a second preset condition is satisfied, adding a new blockchain into the blockchain system as a sidechain, and adding, in the blockchain data record table, a record corresponding to the new blockchain and transaction type identification information of the new blockchain. As shown in FIG. 3 and FIG. 4, in the blockchain system, a sidechain may branch off a blockchain under certain conditions for processing transaction data having values 1 and 2 of transaction feature information, and the transaction type identifier of the sidechain is 3. For example, when an event for promoting users to perform mobile phone authentication is held, such as "earn points for using mobile phones for authentication," it is predictable that the concurrent number of mobile phone authentication transactions will be very high. If the concurrent number is to be fully processed by the main chain in the blockchain system, the processing may be delayed, or it is possible that the processing fights for resources against the processing of other types of transactions. In this situation, a sidechain may be separated for incorporating the mobile phone authentication (which has a value 2 of transaction feature information) in the sidechain for execution, thereby meeting processing demand by transaction data of different types in the blockchain system, in particular special processing demand by transaction data of certain types.

For example, the second preset condition may be that the transaction feature information of the transaction data to be added to the blockchain comprised in the blockchain transaction data writing request matches preset transaction feature information. Then, the blockchain system may preset that some transaction types are written into a sidechain. When newly received transaction data to be added to the blockchain belongs to one of these types, the transaction feature information of the transaction data to be added to the blockchain will match the preset transaction feature information. Therefore, a new blockchain may be added as a sidechain in the blockchain system, and a row is added as a record of the transaction data to be added to the blockchain in the blockchain data record table as shown in Table 4.

In addition, the above operation for adding a sidechain may also be executed when the concurrent number of the received blockchain transaction data writing requests reaches a preset threshold value, and/or when a preset time for adding the new blockchain as a sidechain is reached.

In addition to the above operation for adding a sidechain, the blockchain as a sidechain may also be terminated in the blockchain system when a third preset condition is satisfied, for example, the concurrent number of the received blockchain transaction data writing requests is smaller than a preset threshold value and/or a time of validity of the sidechain is reached. Then, a record corresponding to the terminated blockchain may be updated in the blockchain data record table. For example, as shown in FIG. 5, the blockchain system may terminate a sidechain of a blockchain under certain conditions. Taking the sidechain with the transaction type identification information of 3 in FIG. 5 as an example, after this sidechain is terminated, the two types of transaction data with the transaction feature information of 1 and 2 will no longer be written into this terminated sidechain; instead, the two types of transaction data are combined for processing by the main chain.

In another example, various methods may be used to update a record corresponding to the terminated blockchain in the blockchain data record table. For example, the record corresponding to the terminated blockchain may be deleted, or the state information of the terminated blockchain may also be changed to an invalid state. Taking the blockchain data record table shown in Table 4 as an example, assuming that it is desired to terminate the blockchain with the transaction type identification information of 5, the value of the state information corresponding to the blockchain can just be set to "0."

Figure 6:
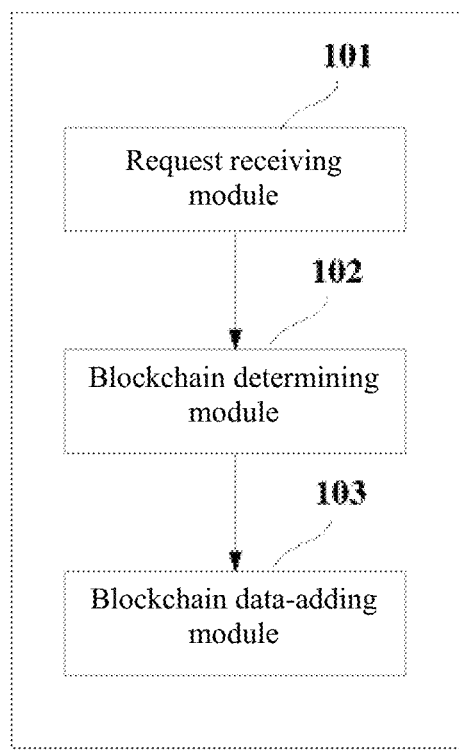
FIG. 6 is a schematic structural diagram of a device for writing transaction data in a blockchain system according to some embodiments of this disclosure.

In addition to the method for writing transaction data in a blockchain system that has been described in detail above, the embodiments of this disclosure further correspondingly provide a device for writing transaction data in a blockchain system, the blockchain system comprises at least one blockchain, and referring to FIG. 6, the device comprises: a request receiving module 101 configured to receive a blockchain transaction data writing request comprising transaction feature information of transaction data to be added to the blockchain; a blockchain determining module 102 configured to determine, from the at least one blockchain, a blockchain matching the transaction data to be added to the blockchain according to a blockchain data record table and the transaction feature information of the transaction data to be added to the blockchain, wherein the blockchain data record table records transaction type identification information associated with the blockchain for reflecting transaction feature information of transaction data in the blockchain; and a blockchain data-adding module 103 configured to write an execution result of the transaction data to be added to the blockchain into the blockchain matching the transaction data to be added to the blockchain.

The blockchain determining module 102 may also be referred to as a data routing module configured to determine which blockchain the transaction data to be added to the blockchain should be routed to for completing the writing into the chain according to a rule reflected in the blockchain data record table.

In some embodiments, the various modules and units of the blockchain system may be implemented as software instructions or a combination of software and hardware. For example, the blockchain system described with reference to FIG. 6 may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules and units described above. In some embodiments, the blockchain system may include a server, a mobile phone, a tablet computer, a PC, a laptop computer, another computing device, or a combination of one or more of these computing devices.

In some embodiments, the blockchain system may maintain at least one blockchain. The blockchain in this disclosure may refer to a series of data blocks generated through association using a cryptographic method. Each data block comprises information of a network transaction for verifying the validity of the information and generating the next block. The blocks are stored in a manner that they are connected end to end like a chain. Based on the characteristics of chain storage, transaction data may be forked and collected according to transaction types of the transaction data in the embodiments of this disclosure, thereby deploying different storage and computation resources or expanding to additional logics so as to meet different processing demands for transaction data of different transaction types.

In the method and device according to the embodiments of this disclosure, a blockchain system may receive a blockchain transaction data writing request that comprises transaction feature information of transaction data to be added to the blockchain. Since transaction type identification information associated with the blockchain is recorded in a blockchain data record table and the identification information can reflect transaction feature information of transaction data in the blockchain, a blockchain matching the transaction data to be added to the blockchain can be determined according to the blockchain data record table and the transaction feature information of the transaction data to be added to the blockchain, and then an execution result of the transaction data to be added to the blockchain can be written into the matching blockchain. By adopting the technical solutions according to the embodiments of this disclosure, a matching blockchain can be selected according to the transaction feature information of transaction data to be added to the blockchain to complete the process of writing the data into the blockchain, and a blockchain data record table is created that can record blockchains corresponding to transaction types. Therefore, it is possible to distinctively process different types of transaction data, and the processing demands for different types of transaction data in a blockchain system may be satisfied.

One of ordinary skill in the art should understand that the embodiments of this disclosure may be provided as a method, a system, or a computer program product. Therefore, the disclosed system, apparatus, or device may be implemented as a complete hardware embodiment, a complete software embodiment, or an embodiment combining software and hardware. Moreover, the disclosed system, apparatus, or device may be in the form of a computer program product implemented on one or more computer usable storage media (including, but not limited to, a magnetic disk memory, CD-ROM, an optical memory, etc.) comprising computer usable program codes.

This disclosure is described with reference to flowcharts and/or block diagrams of the method, device (system), and computer program product according to the embodiments of this disclosure. A computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In an example of a configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the definitions in the specification, the computer readable media do not include transitory media, such as modulated data signals and carriers.

The terms of "including," "comprising," or any other variants of the terms are intended to encompass a non-exclusive inclusion, causing a process, method, commodity, or device comprising a series of elements to not only comprise these elements, but also comprise other elements that are not listed, or further comprise elements that are inherent to the process, method, commodity, or device. When there is no further restriction, elements defined by the statement "comprising one . . . " do not exclude a process, method, commodity, or device comprising the above elements from further comprising additional elements.

One of ordinary skill in the art should understand that the embodiments of this disclosure may be provided as a method, a system, or a computer program product. Therefore, the disclosed system, apparatus, or device may be implemented as a complete hardware embodiment, a complete software embodiment, or an embodiment combining software and hardware. Moreover, the disclosed system, apparatus, or device may be in the form of a computer program product implemented on one or more computer usable storage media (including, but not limited to, a magnetic disk memory, CD-ROM, an optical memory, etc.) comprising computer usable program codes.

The above-described embodiments of this disclosure are not intended to limit this disclosure. To one of ordinary skill in the art, this disclosure may have various modifications and variations. Any modification, equivalent substitution, or improvement made within the spirit and principle of this disclosure shall be encompassed by the claims of this disclosure.

The invention claimed is:

1. A method for writing transaction data in a blockchain system, the blockchain system maintaining at least an existing blockchain as a main chain, and the method comprising:
   receiving a blockchain transaction data writing request comprising transaction feature information of transaction data to be added to blockchain, wherein a blockchain data record table records the existing blockchain and transaction type identification information of the existing blockchain;
   when a condition is satisfied, adding a new blockchain into the blockchain system as a side chain, and recording, in the blockchain data record table, the new blockchain and transaction type identification information of the new blockchain, wherein the condition comprises (i) that the transaction feature information of the transaction data to be added to blockchain comprised in the blockchain transaction data writing request matches preset transaction feature information, (ii) that a number of concurrently received blockchain transaction data writing requests reaches a preset threshold value, or (iii) that a preset time for adding the new blockchain as the side chain is reached;
   determining, according to the blockchain data record table, a blockchain having first transaction type identification information matching the transaction feature information of the transaction data to be added to blockchain; and
   writing an execution result of the transaction data to be added to blockchain into the determined blockchain.

2. The method according to claim 1, wherein the determined blockchain is the main chain or the side chain.

3. The method according to claim 1, wherein the transaction feature information of the transaction data to be added to blockchain is $N^{th}$ power of 2, and N is 0 or a positive integer; and the transaction type identification information of the existing blockchain is a sum of different pieces of transaction feature information of transaction data in the existing blockchain.

4. The method according to claim 3, wherein the first transaction type identification information matching the transaction feature information of the transaction data to be added to blockchain comprises:
   if an "&" logic operation on a value of the first transaction type identification information and a value of the transaction feature information of the transaction data to be added to blockchain is equal to the value of the transaction feature information of the transaction data to be added to blockchain, the first transaction type identification information matches the transaction feature information of the transaction data to be added to blockchain.

5. The method according to claim 1, further comprising:
   when no blockchain has the first transaction type identification information matching the transaction feature information of the transaction data to be added to blockchain, identifying a blockchain corresponding to preset second transaction type identification information as the determined blockchain.

6. The method according to claim 1, wherein the blockchain data record table further records state information associated with each blockchain, and state information associated with the determined blockchain is a valid state.

7. The method according to claim 1, wherein the blockchain data record table further records a hash value of a last block of each blockchain and a corresponding time stamp, and the writing an execution result of the transaction data to be added to blockchain into the determined blockchain comprises:
- extracting a last block hash value corresponding to the determined blockchain matching the transaction data to be added to blockchain and a time stamp corresponding to the determined blockchain;
- writing an execution result of the transaction data to be added to blockchain, the last block hash value corresponding to the determined blockchain, and the time stamp corresponding to the determined blockchain into a new block of the determined blockchain; and
- updating the blockchain data record table with a hash value of the new block and a corresponding time stamp of the new block.

8. A method for writing transaction data in a blockchain system, the method comprising:
- receiving a blockchain transaction data writing request comprising transaction feature information of transaction data to be added to blockchain, wherein the blockchain system comprises a plurality of blockchains including a main chain and a side chain, and wherein a blockchain data record table records the plurality of blockchains and transaction type identification information of each of the plurality of blockchains;
- when a condition is satisfied, terminating the side chain in the blockchain system, and updating a record corresponding to the side chain in the blockchain data record table, wherein the condition comprises (i) that a number of concurrently received blockchain transaction data writing requests is smaller than a preset threshold value or (ii) that a time of validity of the side chain is reached;
- determining, according to the blockchain data record table, a blockchain having transaction type identification information matching the transaction feature information of the transaction data to be added to blockchain; and
- writing an execution result of the transaction data to be added to blockchain into the determined blockchain.

9. The method according to claim 8, wherein the updating a record corresponding to the side chain in the blockchain data record table comprises:
- deleting the record corresponding to the side chain.

10. The method according to claim 8, wherein the blockchain data record table records state information of each of the plurality of blockchains, and the updating a record corresponding to the side chain in the blockchain data record table comprises:
- changing state information of the terminated blockchain to an invalid state.

11. A system for writing transaction data, the system maintaining at least an existing blockchain as a main chain and comprising one or more processors and one or more non-transitory computer-readable memories coupled to the one or more processors and configured with instructions executable by the one or more processors to cause the system to perform operations comprising:
- receiving a blockchain transaction data writing request comprising transaction feature information of transaction data to be added to blockchain, wherein a blockchain data record table records the existing blockchain and transaction type identification information of the existing blockchain;
- when a condition is satisfied, adding a new blockchain into the blockchain system as a side chain, and recording, in the blockchain data record table, the new blockchain and transaction type identification information of the new blockchain, wherein the condition comprises (i) that the transaction feature information of the transaction data to be added to blockchain comprised in the blockchain transaction data writing request matches preset transaction feature information, (ii) that a number of concurrently received blockchain transaction data writing requests reaches a preset threshold value, or (iii) that a preset time for adding the new blockchain as the side chain is reached;
- determining, according to the blockchain data record table, a blockchain having first transaction type identification information matching the transaction feature information of the transaction data to be added to blockchain; and
- writing an execution result of the transaction data to be added to blockchain into the determined blockchain.

12. The system of claim 11, wherein the determined blockchain is the main chain or the side chain.

13. A non-transitory computer-readable storage medium for writing transaction data in a blockchain system, the system maintaining at least an existing blockchain as a main chain, the storage medium configured with instructions executable by one or more processors to cause the one or more processors to perform operations comprising:
- receiving a blockchain transaction data writing request comprising transaction feature information of transaction data to be added to blockchain, wherein the blockchain system comprises a plurality of blockchains including a main chain and a side chain, and wherein a blockchain data record table records the plurality of blockchains and transaction type identification information of each of the plurality of blockchains;
- when a condition is satisfied, terminating the side chain in the blockchain system, and updating a record corresponding to the side chain in the blockchain data record table, wherein the condition comprises (i) that a number of concurrently received blockchain transaction data writing requests is smaller than a preset threshold value or (ii) that a time of validity of the side chain is reached;
- determining, according to the blockchain data record table, a blockchain having transaction type identification information matching the transaction feature information of the transaction data to be added to blockchain; and
- writing an execution result of the transaction data to be added to blockchain into the determined blockchain.

14. The storage medium of claim 13, wherein the updating a record corresponding to the side chain in the blockchain data record table comprises:
- deleting the record corresponding to the side chain.

* * * * *